US012585903B1

(12) United States Patent
Daniel Gnanarajan et al.

(10) Patent No.: US 12,585,903 B1
(45) Date of Patent: Mar. 24, 2026

(54) PROOF OF PRESENCE USING MACHINE-READABLE CODES

(71) Applicant: Apple Inc., Cupertino, CA (US)

(72) Inventors: Bennet Daniel Gnanarajan, Singapore (SG); Sachin Kapoor, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/894,612

(22) Filed: Sep. 24, 2024

(51) Int. Cl.
   *G06K 7/14* (2006.01)
(52) U.S. Cl.
   CPC ................................... *G06K 7/1417* (2013.01)
(58) Field of Classification Search
   CPC ..................................................... G06K 7/1417
   See application file for complete search history.

(56) References Cited

U.S. PATENT DOCUMENTS

2012/0265679 A1    10/2012   Calman et al.
2019/0043022 A1     2/2019   Fosmark et al.
2019/0080316 A1*    3/2019   Douglas ............... G06Q 20/322
2021/0392054 A1    12/2021   David et al.
2024/0114075 A1     4/2024   Gordon et al.
2024/0291661 A1     8/2024   Barbir et al.

OTHER PUBLICATIONS

International Search Report and Written Opinion issued in PCT Application No. PCT/US2025/039610, dated Nov. 13, 2025 in 10 pages.
Corrected Notice of Allowability issued in U.S. Appl. No. 18/894,561, dated Sep. 29, 2025 in 2 pages.
Notice of Allowance issued in U.S. Appl. No. 18/894,561, dated Sep. 9, 2025 in 10 pages.

* cited by examiner

*Primary Examiner* — Matthew Mikels
(74) *Attorney, Agent, or Firm* — Kilpatrick Townsend & Stockton LLP

(57) ABSTRACT

Techniques are disclosed for confirming proof-of-presence of a user device using machine-readable codes. A server device can initiate a data exchange session with a terminal device. While in the data exchange session, the server device can send first information usable to generate a machine-readable code at the terminal device. The server device can then receive an indication that the user device has obtained the machine-readable code. In response to the indication, the server device can generate a token corresponding to the user device and send second information including the token to the terminal device. The second information can be usable to generate an updated machine-readable code at the terminal device. The server device can receive a data exchange request including the token from the user device and validate the token.

20 Claims, 11 Drawing Sheets

300 ⟶

MEMORY 430

O/S 422

TRANSACTION APPLICATION 424

CAMERA APPLICATION 426

TOKEN 428

COMM. INTERFACE 412

PROCESSOR(S) 414

STORAGE 416

I/O DEVICES 418

CAMERA 420

USER DEVICE 402

TERMINAL APPLICATION 460

TERMINAL DEVICE 408

NETWORK(S) 404

MEMORY 442

O/S 452

TRANSACTION APPLICATION 454

TOKEN 456

COMM. INTERFACE 444

PROCESSOR(S) 446

STORAGE 448

I/O DEVICES 450

SERVER DEVICE 406

400

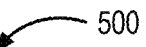

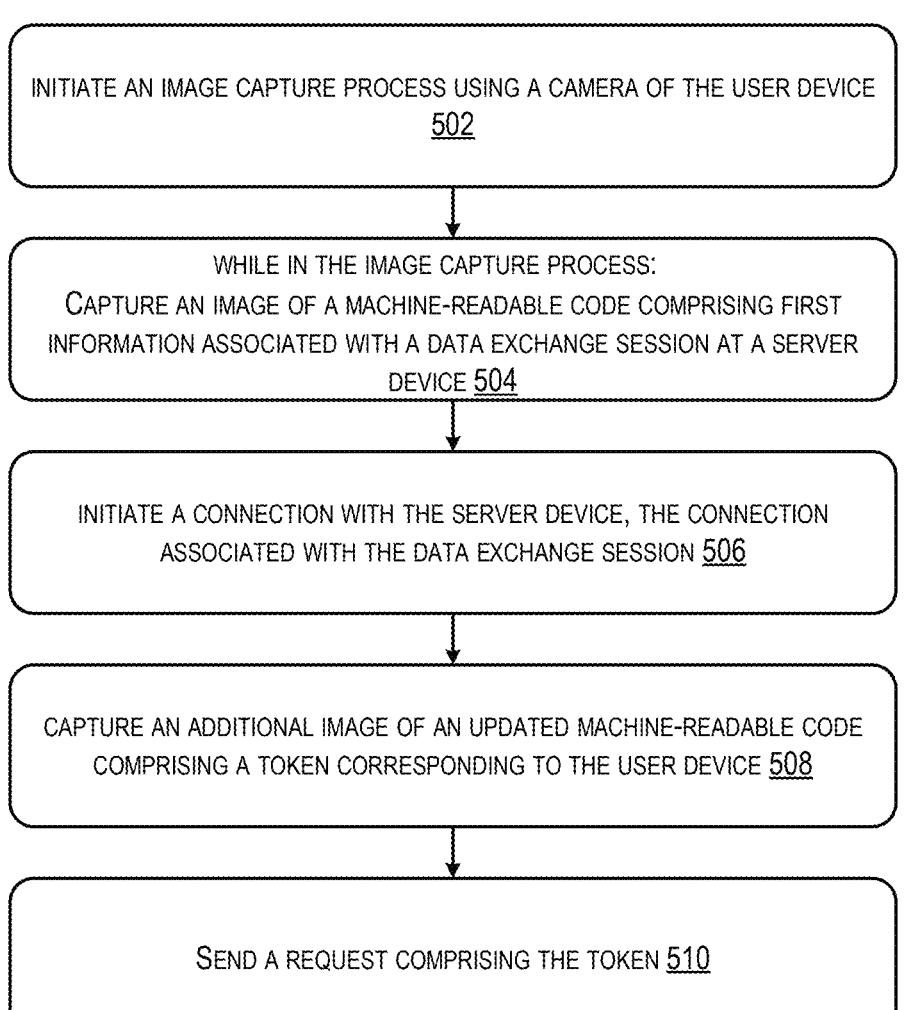

INITIATE AN IMAGE CAPTURE PROCESS USING A CAMERA OF THE USER DEVICE
502

WHILE IN THE IMAGE CAPTURE PROCESS:
CAPTURE AN IMAGE OF A MACHINE-READABLE CODE COMPRISING FIRST INFORMATION ASSOCIATED WITH A DATA EXCHANGE SESSION AT A SERVER DEVICE 504

INITIATE A CONNECTION WITH THE SERVER DEVICE, THE CONNECTION ASSOCIATED WITH THE DATA EXCHANGE SESSION 506

CAPTURE AN ADDITIONAL IMAGE OF AN UPDATED MACHINE-READABLE CODE COMPRISING A TOKEN CORRESPONDING TO THE USER DEVICE 508

SEND A REQUEST COMPRISING THE TOKEN 510

FIG. 5

RESPONSIVE TO A REQUEST FROM A TERMINAL DEVICE, INITIATE A DATA EXCHANGE SESSION WITH THE TERMINAL DEVICE 602

WHILE IN THE DATA EXCHANGE SESSION:
SEND FIRST INFORMATION ASSOCIATED WITH THE DATA EXCHANGE SESSION, THE FIRST INFORMATION USABLE TO GENERATE A MACHINE-READABLE CODE AT THE TERMINAL DEVICE 604

RECEIVE AN INDICATION THAT THE USER DEVICE HAS OBTAINED THE MACHINE-READABLE CODE 606

RESPONSIVE TO THE INDICATION, GENERATE A TOKEN CORRESPONDING TO THE USER DEVICE 608

SEND SECOND INFORMATION ASSOCIATED WITH THE DATA EXCHANGE SESSION, THE SECOND INFORMATION USABLE TO GENERATE AN UPDATED MACHINE-READABLE CODE AT THE TERMINAL DEVICE, THE SECOND INFORMATION COMPRISING THE TOKEN 610

RECEIVE A DATA EXCHANGE REQUEST COMPRISING THE TOKEN 612

VALIDATING THE TOKEN RECEIVED WITH THE DATA EXCHANGE REQUEST 614

FIG. 6

App Process

App Process

API
790

Implementation Module
700

SYSTEM 710

DEVICE 750

APPLICATION 760

Application
Implementation Module
770

API Calling Module
780

PROOF OF PRESENCE USING MACHINE-READABLE CODES

CROSS-REFERENCES TO RELATED APPLICATIONS

This application is related to U.S. application Ser. No. 18/894,561, filed on the same day, and entitled "PROOF OF PRESENCE USING MACHINE-READABLE CODES," the entire contents of which are herein incorporated by reference in their entirety for all purposes.

BACKGROUND

Computing devices, including smartphones, can initiate transactions and other data exchanges using various communications techniques. For example, a smartphone can use near-field communication to begin a data exchange with another device as part of an access request, for instance to open a secure door. In some cases, the data exchange can be initiated by the smart phone scanning a machine-readable code like a barcode that is presented on a screen of another computing device. However, visible codes like barcodes can be readily duplicated into other media like paper or an image on a different device, so that the code may no longer be guaranteed to be presented on the displaying computing device. In some cases, the code may be reused to initiate an unapproved transaction or data exchange. There is a need, therefore, for techniques to improve the security of machine-readable codes.

BRIEF SUMMARY

Embodiments of the present disclosure relate to techniques for ensuring that a device, like a smartphone, that scans a machine-readable code, like a QR code, displayed by another computing device, is physically present with the displaying device. More particularly, embodiments of the present disclosure provide methods, user devices, server devices, and computer-readable media that can present a first machine-readable code and, after a user device scans the first machine-readable code, generate a second machine-readable code that includes a token corresponding to the user device. The second machine-readable code can be presented to the user device while the user device is still "scanning" for machine-readable codes, so that the second machine-readable code is captured by the user device. The user device can then transmit the token to the backend system that generated the second machine-readable code for validation. Once validated, a confirmation can be provided to the user device, indicating to a user that the data exchange that was initiated by the first machine-readable code has been successfully completed. The second machine-readable code can be presented to the user device in place of the first machine-readable code, so that no indication is given that two machine-readable codes have been used to initiate and validate the data exchange. In doing so, the second machine-readable code and the validation of the token ensure that the user device is present (e.g., close enough to scan the codes) at the device presenting the machine-readable codes. By ensuring "proof of presence," such techniques can avoid instances where a machine-readable code is duplicated and then scanned at a different location or by a different device than the intended device.

One embodiment is directed to a method performed by a server device. The method can include the server device initiating a data exchange session with a terminal device.

The server device can initiate the data exchange session in response to a request from the terminal device. The method can also include, while in the data exchange session, the server device sending, to the terminal device, first information associated with the data exchange session and receiving, from a user device, an indication that the user device has obtained the machine-readable code. The first information can be used by the terminal device to generate a machine-readable code at the terminal device. The method can also include, while in the data exchange session, the server device generating a token corresponding to the user device in response to the indication and sending to the terminal device, second information associated with the data exchange session. The second information can be used by the terminal device to generate an updated machine-readable code at the terminal device. The second information can include the token, so that the updated machine-readable code also includes the token. The method can also include, while in the data exchange session, the server device receiving, from the user device, a data exchange request comprising the token and validating the token received with the data exchange request.

Another embodiment is directed to a user device that includes one or more processors and one or more memories storing instructions that, when executed by the one or more processors, cause the server device to perform any of the methods described above.

Still another embodiment is directed to a non-transitory computer-readable medium storing computer-executable instructions that, when executed by one or more processors of a user device, cause the server device to perform any of the methods described above.

BRIEF DESCRIPTION OF THE DRAWINGS

FIG. 5 illustrates an example process for proof of presence in a data exchange session between a user device and a terminal device, according to some embodiments.

FIG. 6 illustrates an example process for generating a second machine-readable code and a token by a server device for proof of presence in a data exchange session, according to some embodiments.

DETAILED DESCRIPTION

Figure 1:
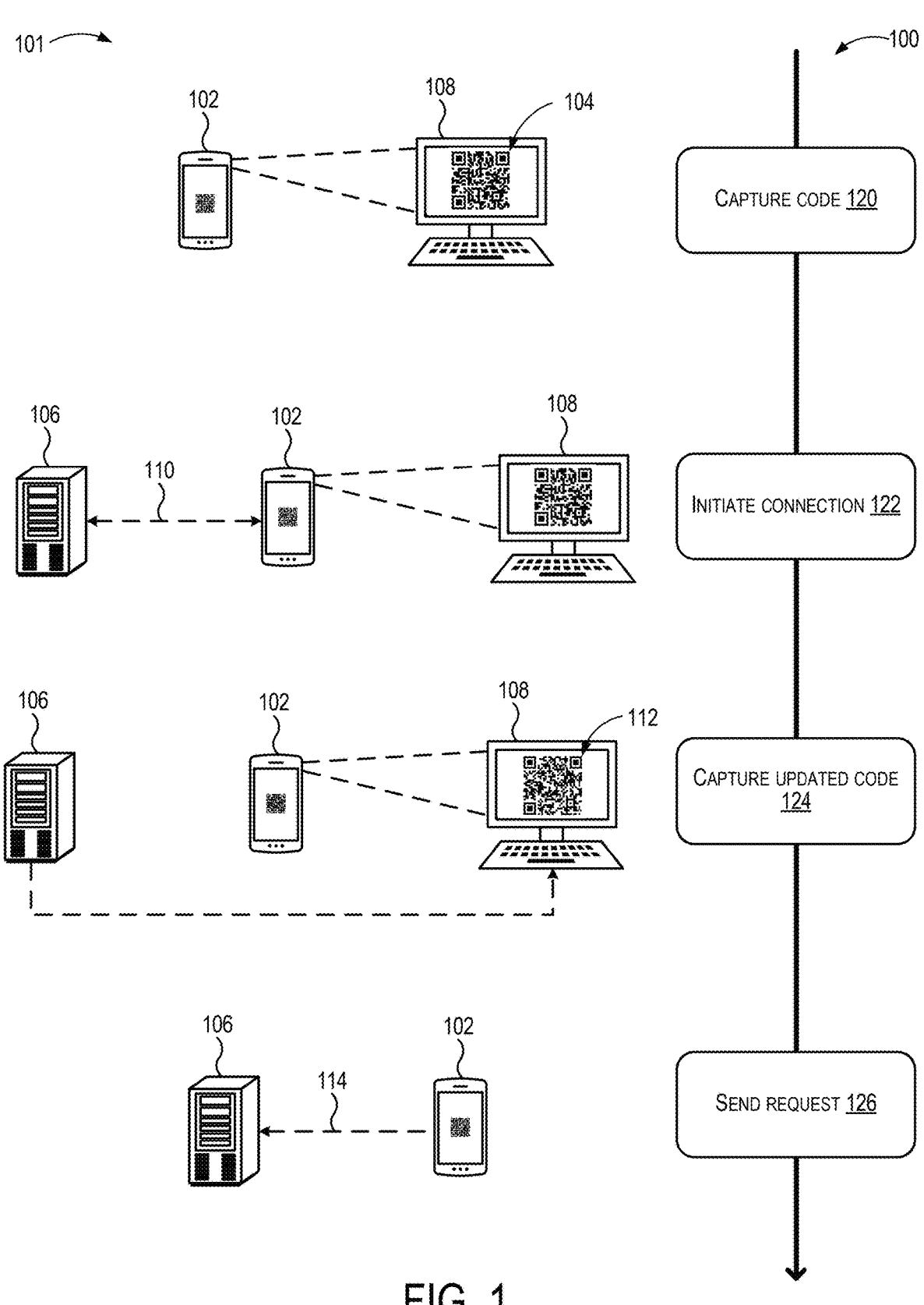
FIG. 1 illustrates a simplified flow chart and block diagram of a technique to provide proof of presence of a user device scanning a machine-readable code, according to some embodiments.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples of the present disclosure are directed to, among other things, methods, systems, devices, and computer-readable media for ensuring that a device, like a smartphone, that scans a machine-readable code, like a quick response (QR) code, displayed by another computing device, is physically present with the displaying device. Certain transactions between computing devices can be initiated or mediated with machine-readable codes, including visual codes like barcodes, QR codes or other matrix barcodes, and the like. As some common examples, scanning a QR code can allow a smartphone to access a website, initiate an app download, or acquire an access credential or similar information. In other examples, a smartphone can be used to present a QR code containing credentials, user account tokens, or other information to allow or grant access to facilities (e.g., parking garages, offices) and events (e.g., sporting events, concerts, etc.). QR codes and other similar machine-readable codes can also be used to initiate transactions between user devices and/or various backend systems and networks. For example, payment apps can use QR codes to exchange account identifiers or to initiate payments between parties/accounts. Initiated payments can involve data transfers between the device scanning the QR code, the device presenting the QR code, and one or more backend systems including server devices providing services related to payments using the user device and payment processing networks that exchange data related to the transaction between the device presenting the QR code and computing systems of one or more banks.

Because a visual machine-readable code like a QR code represents static information, if the code is duplicated (e.g., copied, photographed, etc.), it can be reused at a later time for possibly a different purpose. Depending on the information represented in the QR code, such copying may pose a security vulnerability for the data exchange. For example, the QR code could include information related to a particular item sold and the price. Duplicating the QR code could allow for a duplicate transaction or a subsequent transaction using outdated parameters like price. Conventionally, the way to improve security for data exchanges initiated or mediate via a QR code or other machine-readable code is to limit the time for which the code is valid or to periodically refresh the code (e.g., by replacing the original code with a new code). For example, codes us access to events typically refresh every ten seconds. As another example, codes used to initiate a payment transaction may only be valid for ten seconds (or other predetermined period of time). By limiting the time period of validity of a machine-readable code and/or periodically refreshing previously generated codes, attempts to reuse an old code will fail.

However, in the context of initiating a transaction between a user device and an arbitrary computing device like a POS terminal, such conventional security measures impede another aspect of information security: confirming that the user device that is accessing the QR code is actually the user device present at the computing device. For example, a user may pay for an item in a payment transaction at a point of sale (POS) terminal. The POS terminal may be configured to display a QR code to initiate the payment transaction. The user can use a smartphone camera to scan the QR code to initiate the payment transaction, after which the user device communicates with a service provider to process the transaction in communication with other computing systems associated with POS terminal and financial institutions. Because the QR code can be duplicated, and because the user device scanning the QR code is a one-way exchange of information from the POS terminal to the user device, the POS terminal and its associated backend systems may not be able to guarantee that the device purporting to scan the QR code is the user device present at the POS terminal. A conventional refresh rate or time-to-live to the presented code can improve the likelihood that the device accessing the code is present at the POS terminal, but too short a time period of validity or between refreshes can hinder the user device successfully scanning the QR code in the first place (e.g., the code may expire prior to a successful scan).

To avoid this issue with the conventional QR code security features, the techniques described herein provide methods for confirming proof-of-presence using a second QR code that is generated in response to the scan of the first QR code and presented at the terminal device. Rather than continuously refreshing codes or enforcing a short time-to-live on a code, once a user device has successfully scanned the first QR code and initiated the data exchange session, a server device associated with the user device can generate a token that can be included in the second QR code. The token can then be sent to the terminal device to generate the second QR code and displayed in place of the first QR code. Upon successfully scanning the second QR code, the user device can send the token to the server device, which can in turn validate that the token received from the user device matches the token generated initially. Since visual machine-readable codes are scanned using a camera of the user device, in the technique described above the user device may not provide an indication that the first code was successfully scanned and the data exchange successfully initiated. Instead, the user device may display an indication after the second code is successfully scanned. In doing so, a user of the user device can continue the scanning process with the camera until both codes are successfully scanned. A premature indication may lead the user to withdraw the user device prior to the second code being displayed.

The techniques described herein provide a number of technical improvements to address a number of technical problems as compared to conventional systems and techniques. In situations where the security posture of one computing device may not allow data exchange sessions to be initiated directly on that computing device, using two machine-readable codes can both initiate the data exchange session with a user device and confirm that the user device is present at the computing device. For example, a web browser on a general purpose computer can present web pages allowing payments for goods and services obtained online, but may not allow particular payment methods via the webpage but that would otherwise be available through an application on a user device (e.g., due to improved security features on a smartphone tied to a particular user account as compared to the general purpose computer). The web page can then display a QR code or similar machine-readable code that can be scanned by the user device to initiate the payment using the application on the user device. Then, to confirm that the user device that accesses the information in the QR code to initiate the transaction is the same user device that scanned the QR code at the general purpose computer, the web page can present the second QR code.

In addition to improving and expanding the functionality of data exchanges, the techniques described herein also improve the use of computing resources for managing machine-readable codes. For example, the server device that manages the codes can reduce the computational expenditures related to continuously refreshing codes associated with a particular data exchange session. Instead, the server device can generate the second code and the token in response to the initial scan by the user device, reducing the amount of resources needed to continuously refresh or manage multiple codes.

Although the techniques described herein for data exchange make reference to the particular illustrative example of payment transactions, the technical benefit can be applied to other data exchange scenarios. A data exchange, as used herein, can refer to a particular transmission and/or reception of defined data between the user device or systems associated with the user device (e.g., backend systems associated with a user account tied to the user device) and the other computing device and in which the user device and/or computing device may be configured to perform additional operations outside the data exchange session to verify and/or validate the exchange. In the examples described briefly above, the other computing device may be a terminal device configured to process data exchanges with systems associated with the user device and may access, for example, additional computing devices or service providers over a separate network to verify, validate, or otherwise confirm the data exchanged with the user device. For example, the data exchange session can include the transmission of access credentials in which a different level of access can be granted as a data exchange option.

Also, in addition to visual machine-readable codes, the techniques described herein can be applied to machine-readable codes that are scanned by a user device using a non-visual scanner. For example, the machine-readable code can be information received by the user device over a wireless communication channel like Bluetooth or a near-field communication.

Turning now to the figures, FIG. 1 illustrates a simplified flow chart and block diagram 101 of an example process 100 to provide proof of presence of a user device 102 scanning a machine-readable code 104, according to some embodiments. The diagram 101 includes a user device 102, a terminal device 108, and a server device 106, which may be examples of computer devices that are configured to communicate over one or more networks to perform data exchange operations, including initiating a payment transaction or other data transaction or providing access credentials to gain access to secure resources (e.g., open a secure door, access a secure file on a computing device). The user device 102 is illustrated as a smartphone. In some embodiments, the user device 102 can be any suitable user device including smartphone, tablet, smart watch or other similar device that allows the device to capture a machine-readable code 104 from the terminal device 108. In particular examples, the user device 102 can have a camera for scanning visual machine-readable codes including matrix barcodes like QR codes. In some examples, the user device 102 may include one or more applications that include algorithms and other logic, code, or executable instructions, to enable performance of at least some of the techniques described herein. The user device 102 may also include storage media for storing computer-executable instructions (e.g., that make up the application) and other data described herein, including tokens and information from the machine-readable codes. The user device 102 may be operated by a user.

Similarly, the server device 106 may be any suitable computing device or arrangement of one or more computing devices that can be configured to perform the operations described herein and communicate with the user device 102 for performing data exchange operations. In some embodiments, the server device 106 can be one or more virtual machines implemented within a cloud computing or other hosted environment. The cloud computing environment may include provisioned computing resources like compute, storage, and networking. For example, the server device 106 can include cloud-based computing with associated storage for maintaining account information for a user account associated with the user device and for generating information and machine-readable codes containing the information. The server device 106 can also be configured to communicate with other computing systems for facilitating the data exchange. For example, the server device 106 can communicate with third-party service providers for validating information related to the data exchange including payment transaction information. The server device 106 can also communicate with terminal device 108 to, for example, send machine-readable codes (or information usable to generate machine-readable codes) to the terminal device 108.

The terminal device 108 may be a suitable computing device for communicating with the user device 102 in a data exchange session. In some examples, the terminal device 108 may be a point of sale (POS) system having a display that can show a visual machine-readable code. In some other examples, the terminal device 108 may be a point of sale (POS) system that can communicate with the user device using near-field communication (NFC) for transmitting non-visual machine-readable codes. In some other examples, the terminal device 108 may be a computer running a web browser application and configured to show network resources provided from a server computer or computers, including computing instances implemented in a cloud-computing environment. For example, the terminal device 108 may be a laptop computer running a web browser application showing a payments page on an e-commerce website. To support payment methods that may be available on the user device 102 but not the terminal device 108, the web page can be used to display machine-readable codes as described herein to facilitate payments using the user device 102. Beyond the use in payments, the terminal device 108 can be an access control terminal for providing access to various locations. Additional details about exemplary user devices, server devices, and terminal devices like user device 102, terminal device 108, and server device 106 are described below with respect to FIG. 4.

The process 100, and any other process described herein (e.g., processes 500 and 600 of FIGS. 5 and 6, respectively) are illustrated as logical flow diagrams, each operation of which represents a sequence of operations that can be implemented in hardware, computer instructions, or a combination thereof. In the context of computer instructions, the operations may represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes described herein may be performed under the control of one or more computer systems configured with specific executable instructions and may be implemented as code (e.g., executable instructions, one or more computer programs, or one or more applications) executing collectively on one or more processors, by hardware, or combinations thereof. As noted above, the code may be stored on a non-transitory computer-readable storage medium, for example, in the form of a computer program including a plurality of instructions executable by one or more processors.

The process 100 can begin at block 120 when the user device 102 captures a machine-readable code 104 from the terminal device 108. For example, the terminal device 108 can display the machine-readable code 104 on a display and a camera (and associated camera application running on the user device 102) can be used to capture one or more images of the displayed machine-readable code 104. The machine-readable code 104 can first information related to a data exchange. For example, the machine-readable code 104 can include information like transaction identifiers, price/cost, merchant identifiers, payment methods, network information like uniform resource identifiers (usable by the user device 102 to proceed with the transaction), and other information associated with a payment transaction to be initiated from the terminal device 108. The terminal device 108 can communicate with the server device 106 to obtain information related to the data exchange. The user device 102 can decode the machine-readable code 104 according to one or more defined standards associated with the machine-readable code 104. For example, if the machine-readable code 104 is a QR code, the user device 102 can use the captured image of the QR code to decode the information contained in the machine-readable code 104 according to the standards defined for QR codes (e.g., ISO/IEC 18004).

At block 122, the user device 102 can initiate a connection 110 with the server device 106. The user device 102 can send a request to the server device 106 over the connection 110 using the information obtained from the machine-readable code 104 displayed at the terminal device 108. Initiating the connection 110 can occur while the user device 102 is still "scanning" the terminal device 108 with its camera (or other receiver for non-visual machine-readable codes). In response to receiving the request, the server device 106 can generate a token corresponding to the user device 102. For example, the server device 106 may maintain information like a device identifier corresponding to a user account of the user device 102. The server device 106 can then generate a token that uniquely identifies the user device 102. In some examples, the token may be a cryptographic hash generated from the device identifier or other information corresponding to the user account or the user device 102.

At block 124, the user device 102 can capture an updated machine-readable code 112. The updated machine-readable code 112 can be sent to the terminal device 108 by the server device 106. In some examples, the server device 106 can send second information to the terminal device 108, so that the terminal device 108 can generate the updated machine-readable code 112 using the second information. The second information can include the token. The terminal device 108 can present the updated machine-readable code 112 at the display in place of the machine-readable code 104. For example, while the user device 102 camera is imaging the machine-readable code 104, the terminal device 108 can replace the machine-readable code 104 with the updated machine-readable code 112. Since the user device 102 is still "scanning" the display of the terminal device 108, it will scan the updated machine-readable code 112 once it is displayed by the terminal device 108.

At block 126, the user device 102 can send a request 114 to the server device 106. The request 114 can include the token obtained from the updated machine-readable code 112. The server device 106 can then validate the token received in the request 114 with the originally generated token (or the information used to generate the token). If the token received in the request 114 matches the original token, the server device 106 can confirm that the user device 102 is present at the terminal device 108 and proceed with the data exchange. For example, upon validating the token received in the request 114, the server device 106 can send further information to the terminal device 108 and/or to a third-party system (e.g., a payments processing network) to proceed with the data exchange. In some examples, the server device 106 can also send an indication to the user device 102 that the data exchange has been successfully initiated or is successfully proceeding. The user device 102 can then display a confirmation or other indication to the user. For instance, until the user device 102 receives the indication from the server device 106 that the token was successfully validated, the user device 102 may not provide any feedback to a user about whether the machine-readable code 104 was successfully capture and decoded by the user device 102 (in block 120). In this way, the user will likely continue to hold the user device 102 to continue scanning the display of the terminal device 108 until proof-of-presence has been confirmed by the server device 106.

Figure 2A:
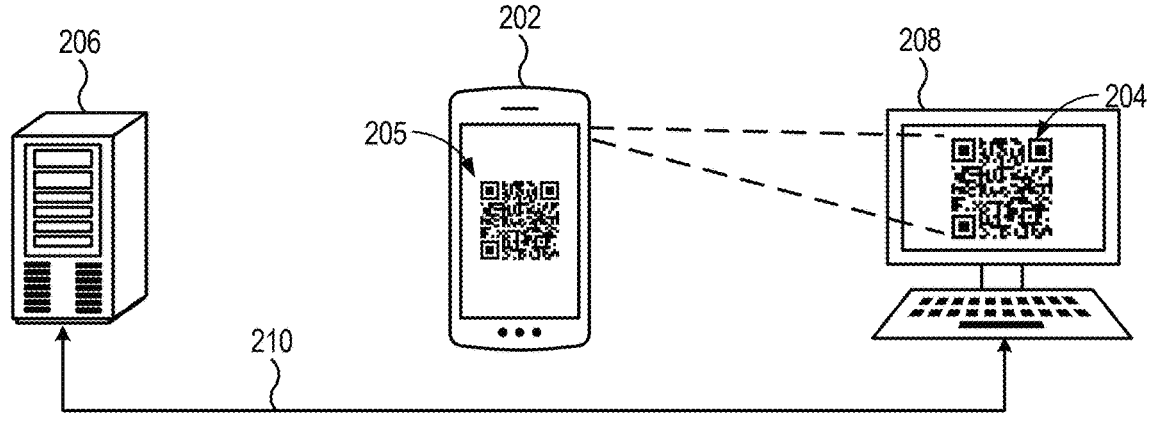
FIG. 2A illustrates a user device scanning a first machine-readable code presented by a terminal device, according to some embodiments.

FIG. 2A illustrates a user device 202 scanning a first machine-readable code 204 presented by a terminal device 208, according to some embodiments. The user device 202 and terminal device 208 may be examples of user device 102 and terminal device 108, respectively, described above with respect to FIG. 1. A server device 206 (which may be an example of server device 106 of FIG. 1) can communicate with the terminal device 208 over a connection 210 to establish the data exchange session. For example, the server device 206 can send first information to the terminal device 208 that is usable to generate the first machine-readable code 204. The connection 210 can be initiated by the terminal device 208 at the beginning of the data exchange session, in order to obtain the first information. In some examples, the terminal device 208 can be preconfigured with the first information usable to generate the first machine-readable code 204. For example, the terminal device 208 can maintain some information associated with a payment method facilitated by the server device 206. The terminal device 208 can then use the preconfigured first information and additional information related to the data exchange to generate the first machine-readable code 204.

A camera of the user device 202 can capture one or more images of a display of the terminal device 208. One of the images can include an image 205 of the first machine-readable code. The user device 202 can use the image 205 to decode the first machine-readable code 204 and obtain the first information therein.

Figure 2B:
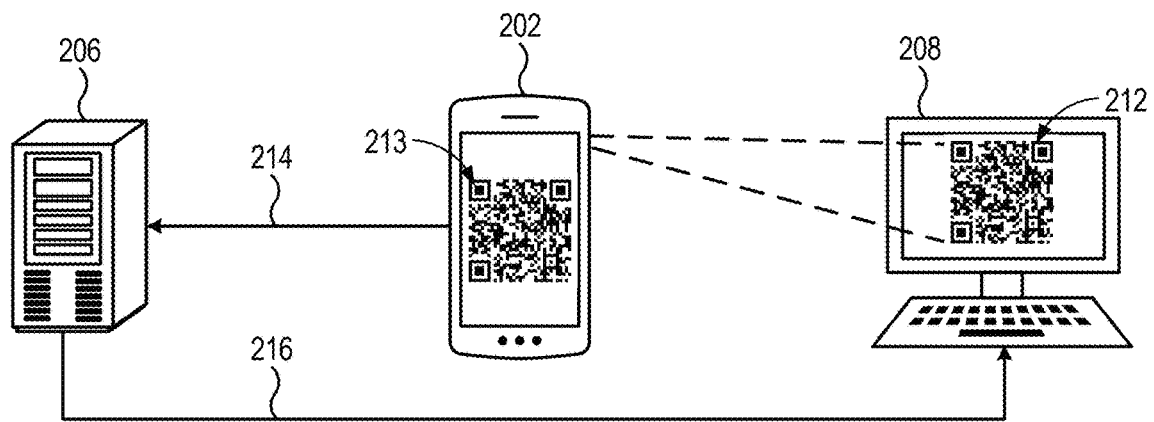
FIG. 2B illustrates the terminal device of FIG. 2A presenting a second machine-readable code generated using second information from the server device and scanned by the user device, according to some embodiments.

FIG. 2B illustrates the terminal device 208 of FIG. 2A presenting a second machine-readable code 212 generated by and presented at the terminal device 208 using second information from the server device 206, and scanned by the user device 202, according to some embodiments. Upon successfully decoding the first machine-readable code 204, the user device 202 can use the information to send a request over connection 214 to the server device 206. Upon receiving the request, the server device 206 can send second information to the terminal device 208 over connection 216. The second information can include a token generated by the server device 206 that uniquely identifies the user device 202. The terminal device 208 can use the second information including the token to generate the second machine-readable code 212.

While the user device 202 is scanning the display of the terminal device 208 using a camera, the terminal device 208 can replace the first machine-readable code 204 with the second machine-readable code 212, as depicted in FIG. 2B. The user device 202 can capture one or more additional images of the display of the terminal device 208, including an image 213 of the second machine-readable code 212. The user device 202 can decode the second machine-readable code to obtain the token. The user device 202 can send the token to the server device 206 using the connection 214.

Figure 2C:
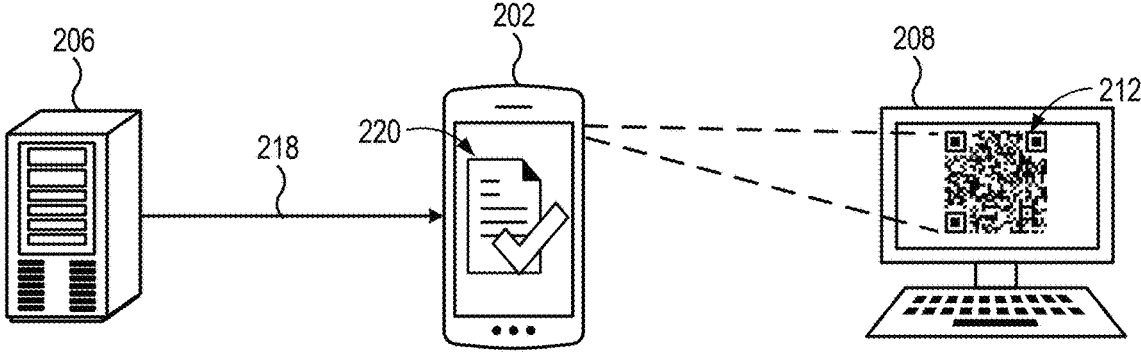
FIG. 2C illustrates the server device of FIG. 2B sending an indication to the user device that the token in the second machine-readable code was successfully validated, according to some embodiments.

FIG. 2C illustrates the server device 206 of FIG. 2B sending an indication 218 to the user device 202 that the token in the second machine-readable code 212 was successfully validated, according to some embodiments. For example, the server device 206 can compare the token received from the user device 202 with the token generated originally. If the tokens match, then the server device 206 can confirm that the user device 202 is present with the terminal device 208 and proceed with the data exchange session. The server device 206 can send the indication 218 to the user device 202. The user device 202 can display a confirmation 220 at a display of the user device 202. In this way, a user of the user device 202 can determine that the scanning process of the display of the terminal device 208 to capture the machine-readable codes (both the first machine-readable code 204 of FIG. 2A and the second machine-readable code 212 of FIGS. 2B and 2C) has completed successfully and that the associated data exchange operation is proceeding (or has been completed successfully).

Although the above description relates to a terminal device displaying a machine-readable code that is captured by a user device, the reverse process may also be implemented according to the techniques described herein. For example, the user device 202 can be configured to display the first machine-readable code 204 and the second machine-readable code 212, while the terminal device 208 can be configured to scan the first machine-readable code 204 and then scan the second machine-readable code 212 when it is displayed by the user device 202. In this example, the terminal device 208 can be configured to communicate with the server device 206 to send the token in the second machine-readable code 212 and verify proof of presence of the user device 202 at the terminal device 208.

Figure 3:
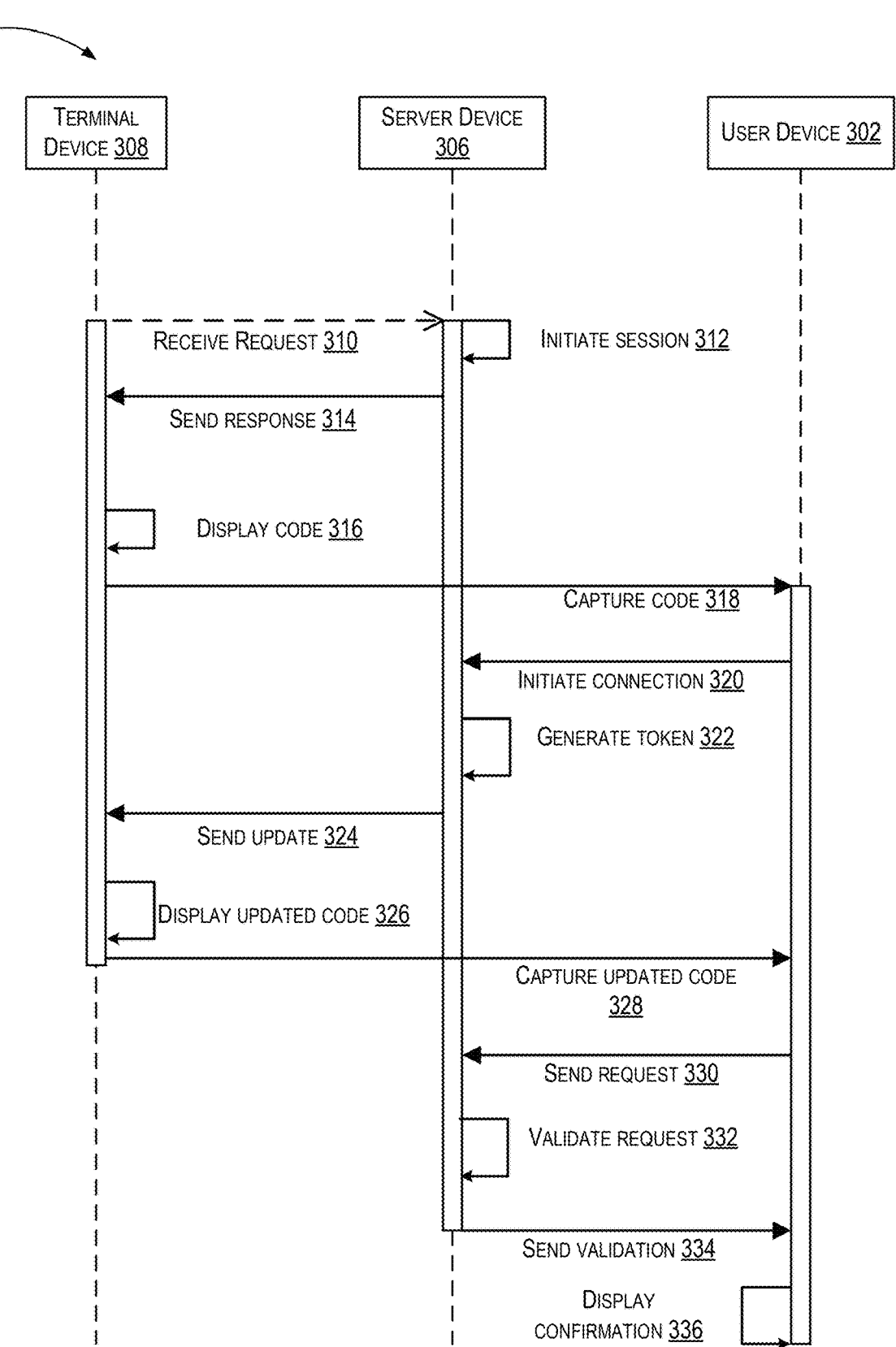
FIG. 3 is a sequence diagram illustrating operations of an example data exchange with proof of presence between a terminal device, a user device, and a server device, according to some embodiments.

FIG. 3 is a sequence diagram illustrating operations of an example data flow 300 with proof of presence between a terminal device 308, a user device 302, and a server device 306, according to some embodiments. The terminal device 308, user device 302, and server device 306 may be examples of similarly named devices described herein, including terminal device 108, user device 102, and server device 106 of FIG. 1, respectively.

In data flow 300, the operations may be similar to operations described above in the sequence between FIGS. 2A, 2B, and 2C. The server device 306 can receive a request 310. The request may a request to initiate a session for a data exchange. For example, a terminal device 308 may be used to complete a payment transaction that is facilitated by the server device 306 in conjunction with the user device 302. In this example, a user may select a payment option on the terminal device that is provided by the server device 306 (in conjunction with the user device 302), but which may not be natively supported by the terminal device 308. In response to the selection, the terminal device 308 can send the request to initiate the transaction with the server device 306.

In response to the request, the server device 306 can initiate the data exchange session 312. The server device can send a response 314 to the terminal device. The response can include first information usable by the terminal device 308 to generate a machine-readable code. For example, the server device 306 can send first information characterizing a payment method supported by the server device 306 in conjunction with the user device 302. The terminal device 308 can then generate the machine-readable code using the first information and additional information about the transaction. The terminal device 308 can then display the generated machine-readable code 316.

The user device 302 can capture the machine-readable code 318. The user device 302 can use a camera to scan the machine-readable code displayed by the terminal device 308. Once the user device 302 decodes the machine-readable code, the user device 302 can use the first information and any additional information to initiate a connection 320 with the server device. For example, the user device 302 can obtain transaction identifiers, device identifiers (e.g., a device identifier for terminal device 308), and other parameters characterizing the data exchange session initiated at the terminal device 308 from the decoded machine-readable code. Initiating the connection 320 can include sending a request associated with the information obtained from the decoded machine-readable code.

The server device 306 can generate a token 322. The server device 306 may maintain information associated with the user device 302 and/or a user account of the user device 302. For example, the server device 306 can maintain a device identifier corresponding to the user device 302. In some examples, the device identifier may be sent to the server device 306 by the user device 302 as part of the request to initiate the connection. The server device 306 can use the device identifier to generate the token. For example, the server device 306 can generate a cryptographic hash using the device identifier and information about the data exchange session received from the user device 302.

The server device 306 can then send an update 324 to the terminal device 308. The update can include the token generated by the server device 306. The terminal device 308 can use the token to generate and display an updated machine-readable code 326. The updated machine-readable code can include some information similar to the information contained in the first machine-readable code (e.g., a transaction identifier) as well as the token.

The user device 302 can capture the updated machine-readable code 328 displayed by the terminal device 308. The user device 302 can decode the updated machine-readable code to obtain the token. The user device 302 can then send a request 330 to the server device 306. The request can include the token obtained from the updated machine-readable code.

The server device 306 can validate the request 332. Validating the request can include comparing the token received in the request with the token originally generated (in operation 322). If the tokens match, then the server device 306 can confirm proof-of-presence of the user device 302 with the terminal device 308. The server device 306 can send a validation 334 to the user device 302 in response to successfully validating the received token. In some embodiments, if the tokens do not match, the server device 306 can send an indication to the user device 302 and/or the terminal device 308 that the data exchange operation is not proceeding due to the lack of proof-of-presence. The user device 302 can display a confirmation 336 in response to receiving the validation. For example, the user device 302 can display a confirmation message or icon to a user at a display of the user device 302.

Figure 4:
FIG. 4 illustrates an example architecture of a system that can implement techniques for proof of presence in a data exchange between a user device and a terminal device, according to some embodiments.

FIG. 4 illustrates an example architecture of a system 400 that can implement techniques for proof of presence in a data exchange between a user device 402 and a terminal device 408, according to some embodiments. The system 400 includes the user device 402 (e.g., a mobile device, a smartphone, or other suitable computing device), the terminal device 408 (e.g., a point of sale terminal), a server device 406, and one or more network(s) 404. The server device 406 may be an example of server device 106 of FIG. 1. The server device 406 can be one or more remote computing devices, including cloud devices. Each of these elements depicted in FIG. 4 may be similar to one or more elements depicted in other figures described herein. In some embodiments, at least some elements of system 400 may be used to perform data exchange operations in a data exchange session, for example an access request and credential exchange or a payment transaction between the user device 402 and the terminal device 408 facilitated by the server device 406. The network(s) 404 may include any one or a combination of many different types of networks, such as cable networks, the Internet, wireless networks, cellular networks, and other private and/or public networks.

As described herein, the user device 402 can have at least one memory 430, a communications interface 412, one or more processing units (or processor(s)) 414, a storage 416, one or more input/output ("I/O") device(s) 418, and a camera 420. The processor(s) 414 may be implemented as appropriate in hardware, computer-executable instructions, firmware or combinations thereof. Computer-executable instruction or firmware implementations of the processor(s) 414 may include computer-executable or machine executable instructions written in any suitable programming language to perform the various functions described. The I/O device(s) 418 can include displays, monitors, touch screens, mouse, keyboard, or other I/O device. The camera 420 can be device for capturing images, including still images and frames of videos. For example, the camera 420 can be used to scan machine-readable codes.

The memory 430 may store program instructions that are loadable and executable on the processor(s) 414, as well as data generated during the execution of these programs, transaction information, data exchange information, terminal device identifiers, a token, and the like. Depending on the configuration and type of user device 402, the memory 430 may be volatile (such as random access memory ("RAM")) or non-volatile (such as read-only memory ("ROM"), flash memory, etc.). In some implementations, the memory 430 may include multiple different types of memory, such as static random access memory ("SRAM"), dynamic random access memory ("DRAM") or ROM. The user device 402 may also include additional storage 416, such as either removable storage or non-removable storage including, but not limited to, magnetic storage, optical disks, and/or tape storage. The disk drives and their associated computer-readable media may provide non-volatile storage of computer-readable instructions, data structures, program components, and other data for the computing devices. In some embodiments, the storage 416 may be utilized to store data contents received from one or more other devices (e.g., server device 406). For example, the storage 416 may store information obtained from decoding the machine-readable codes.

The memory 430 may include an operating system (O/S) 422 and one or more application programs, software components, or services for implementing the features disclosed herein, including a transaction application 424. The transaction application 424 may be configured to execute a data exchange session (e.g., between terminal device 408) for exchanging data related to a transaction (e.g., an access request, a payment transaction). As one example, the transaction application 424 can be a virtual "wallet" containing payment methods tied to one or more accounts associated with the user device, one or more access credentials, and other similar information tied to the user device 402. The transaction application 424 can be configured to send requests to the server device 406 as part of the data exchange session. For example, the transaction application 424 can interpret the machine-readable code scanned at the terminal device 408 to initiate a payment transaction. The transaction application 424 can then send a request to the server device 406 to perform the next operation of the payment transaction (e.g., send transaction information received from the machine-readable code to a third-party service provider to validate a payment method). The memory 430 can also store a token 428 that obtained by the user device 402 with a machine-readable code presented by the terminal device 408.

The user device 402 may also contain a communications interface 412 that allows the user device 402 to communicate with a server including server device 406, a third party service provider, or other devices on the network(s) 404. The communications interface 412 can include a near-field communication (NFC) interface. The user device 402 may also include I/O device(s) 418, such as for enabling connection with a keyboard, a mouse, a pen, a voice input device, a touch input device, a display, speakers, a printer, etc.

Terminal device 408 can be a computing device configured to perform operations of data exchange session with a server device, including server device 406, in conjunction with a user device 402. In some embodiments, the terminal device 408 can be a point of sale (POS) terminal configured for processing payment transactions with an exchange of transaction data with the user device. In some embodiments, the terminal device 408 can be a computing device (e.g., a laptop) that can present network resources (e.g., webpages) including a machine-readable code to initiate payment transactions with a user device for a web-based payments. Terminal device 408 can include a terminal application 460. Terminal application 460 can be configured to generate machine-readable codes using information received from server device 406. For example, terminal application 460 can generate a machine-readable code that includes a token generated by the server device 406 in response to a request sent to server device 406 from user device 402. In some examples, the terminal application 460 can include a web browser application that can display one or more web pages that include the generated machine-readable codes.

Turning now to server device 406 in more detail, the server device 406 can be any suitable type of computing system including, but not limited to, a laptop computer, a desktop computer, a mobile phone, a smartphone, a server computer, etc. In some embodiments, the server device 406 is executed by one or more virtual machines implemented within a cloud computing or other hosted environment. The cloud computing environment may include provisioned computing resources like compute, storage, and networking. The server device 406 can communicate with the user device 402 via the network(s) 404 or other network connections. The server device 406 may be configured to implement the functionality described herein as part of a distributed computing environment.

The server device 406 can include a memory 442, one or more processor(s) 446, I/O devices 450, and at least one storage unit 448. As with the processor(s) 414 of user device 402, the processor(s) 446 may be implemented as appropriate in hardware, computer-executable instructions, software, firmware, or combinations thereof. Computer-executable instruction, software, or firmware implementations of the processor(s) 446 may include computer-executable or machine-executable instructions written in any suitable programming language to perform the various functions described. The memory 442 may store program instructions that are loadable and executable on the processor(s) 446, as well as data generated during the execution of these programs. Depending on the configuration and type of memory included in the server device 406, the memory 442 may be volatile (such as RAM) and/or non-volatile (such as read-only memory ("ROM"), flash memory, or other memory). In some embodiments, the storage 448 may include one or more databases, data structures, data stores, or the like for storing and/or retaining information associated with the server device 406 or the user device 402. The storage 448 may include data stores for storing user account information corresponding to the user device 402, including payment account information, device identifiers, and the like.

The memory 442 may include an operating system (O/S) 452 and one or more application programs, components, or services for implementing the features disclosed herein, including transaction application 454. The transaction application 454 may be configured to transmit information and tokens to the terminal device 408 in response to requests from the user device 402. In some embodiments, the storage 448 may include one or more databases, data structures, data stores, or the like for storing and/or retaining information associated with the server device 406 or the user device 402. The transaction application 454 can also generate the token, including token 456, in response to requests received from the user device 402. The token 456 may be stored in the memory 442 or may be maintained in storage 448.

As with the user device 402, the server device 406 may contain a communications interface 444 that allows the server device 406 to communicate with terminal device 408, a stored database, another computing device or server, or a third party service provider. The server device 406 may also include I/O device(s) 450, such as for enabling connection with a keyboard, a mouse, a pen, a voice input device, a touch input device, a display, speakers, a printer, etc.

As described above, in some embodiments, the user device 402 and the terminal device 408 can be configured to implement a reverse process in which the user device 402 displays the machine-readable codes to the terminal device 408. In these embodiments, the terminal device 408 can include a camera for imaging the machine-readable code displayed by the user device 402. The terminal application

460 of the terminal device 408 can be configured to perform operations including decoding the machine-readable code to obtain a token and send the token to the server device 406. Similarly, the transaction application 424 of the user device 402 can be configured to generate machine-readable codes, including a machine-readable code including a token received from the server device 406.

FIG. 5 illustrates an example process 500 for proof of presence in a data exchange session between a user device and a terminal device, according to some embodiments. The process 500 can be performed by a user device, which may be an example of other user devices described herein, including user device 402 of FIG. 4 and user device 102 of FIG. 1. Some of the operations described with respect to process 500 may be similar to operations described above with respect to data flow 300 of FIG. 3.

The process 500 can begin at block 502, with the user device initiating an image capture process using a camera. For example, a user can activate a camera application (e.g., camera application 426 of FIG. 4) to scan a QR code presented at a terminal device (e.g., terminal device 408 of FIG. 4) to complete payment for an item. The camera can capture an image of the QR code that can be decoded using the camera application or another application on the user device (e.g., a transaction application 424).

The following operations of process 500 described with respect to blocks 504-510 can be performed while the user device is in the image capture process. For example, once the user begins scanning the machine-readable code with the camera of the user device, the operations of blocks 504-510 can occur prior to the user device providing an indication to the user that any of the operations have been successfully performed. In this way, the user device will continue scanning the terminal device during the process 500 in which an updated machine-readable code is presented to confirm proof-of-presence of the user device.

At block 504, the user device can capture an image (e.g., image 205) of a machine-readable code. The machine-readable code can include first information associated with a data exchange session at a server device. For example, the data exchange session can be a payment transaction facilitated by the server device. The first information can include identifiers for the transaction and the terminal device. In some embodiments, the machine-readable code is a quick response (QR) code. The machine-readable code can be presented at a terminal device.

At block 506, the user device can initiate a connection with the server device. The user device can use the first information to establish the connection. For example, the user device can open a websocket to the server device. The connection can be associated with the data exchange session. For example, the terminal device that generated the machine-readable code and the server device may have separately communicated to initiate the data exchange session. The first information can then include information allowing the websocket connection to be associated with the existing data exchange session.

At block 508, the user device can capture an additional image (e.g., image 213 of FIG. 2) of an updated machine-readable code. The updated machine-readable code can be generated by the terminal device and substituted for the machine-readable code. For example, while the user is scanning the terminal device, the machine-readable code can be replaced with the updated machine-readable code. Because the user device is still scanning the terminal device display, the updated machine-readable code will also be scanned as soon as it is displayed. The updated machine-readable code can be generated by the terminal device using second information received from the server device. The second information can include a token generated by the server device. The token can uniquely identify the user device and can associate the user device with the data exchange session.

At block 510, the user device can send a request to the server device. The request can include the token obtained from the updated machine-readable code.

In some embodiments, after sending the request to the server device, the user device can receive a confirmation that the request was successfully validated. For example, the server device may compare the token sent in the request with the originally generated token. If the comparison shows a match with the token, then the server device can confirm that the user device that initiated the connection with the server device (by purportedly scanning the machine-readable code) is present at the location of the terminal device to scan the updated machine-readable code. In response to the confirmation from the server device, the user device can present an indication that the data exchange session is proceeding. For example, the user device can present an icon or message at a display of the user device indicating that the payment transaction has been initiated. As discussed above, by delaying the display of feedback at the user device until the proof-of-presence has been established, the user will continue scanning the terminal device during the transition from the machine-readable code to the updated machine-readable code. The indication can be presented during the image capture process.

FIG. 6 illustrates an example process for generating a second machine-readable code and a token by a server device for proof of presence in a data exchange session, according to some embodiments. The process 600 can be performed by a server device, which may be an example of other server devices described herein, including server device 406 of FIG. 4 and server device 106 of FIG. 1. Some of the operations described with respect to process 600 may be similar to operations described above with respect to data flow 300 of FIG. 3.

The process 600 can begin at block 602, with the server device initiation a data exchange session with the terminal device. The server device can initiate the data exchange session in response to a request from the terminal device. For example, the terminal device for a payment transaction can determine that the user wants to pay using a payment method (e.g., a payment application) not supported directly by the terminal device but which may be offered through the user's user device and facilitated by the server device. Based on this selection, the terminal device can communicate with the server device to obtain information to convey to the user device using a machine-readable code.

The following operations of process 600 described with respect to blocks 604-614 can be performed while the server device is in the data exchange session. For example, the server device may wait to send data related to the data exchange at the terminal device until the operations of blocks 604-614 can occur to confirm proof-of-presence of the user device at the terminal device. In this way, sensitive transactions like payments and secure access credential exchanges are not completed unless the user device initiating the transaction is confirmed to be present at the terminal device.

At block 604, the server device can send first information associated with the data exchange session to the terminal device. The first information can be used by the terminal device to generate a machine-readable code. In some embodiments, the machine-readable code is presented at a display of the terminal device. For example, the terminal device can generate a QR code and display the QR code for a user device to scan to initiate a payment transaction using an application on the user device (e.g., a payment application, a wallet application). The first information can include information that identifies the data exchange session initiated by the server device. For example, the first information can include a transaction identifier.

At block 606, the server device can receive an indication that the user device has obtained the machine-readable code. The indication can be received from the user device. The user device can obtain the machine-readable code by scanning it using a camera (for cases where the machine-readable code is a visual code like a matrix barcode).

At block 608, in response to the indication, the server device can generate a token corresponding to the user device. For example, the server device can maintain account information or device identifier information corresponding to the user device or a user account tied to the user device. Using the user account information or the device identifier information, the server device can generate a token that corresponds to the user device. For example, the token may be a cryptographic hash generated using the device identifier. In some embodiments, the server device can obtain device identifier information as part of the indication that the user device can send after obtaining the machine-readable code. In some embodiments, the token uniquely identifies a user account associated with the user device or uniquely identifies the user device itself.

At block 610, the server device can send second information associated with the data exchange session to the terminal device. The second information can be used by the terminal device to generate an updated machine-readable code at the terminal device. The second information can include the token generated by the server device. For example, the updated machine-readable code can include similar transaction information as the machine-readable code but also include the token as additional information. In some embodiments, the updated machine-readable code is presented at the terminal device by replacing the machine-readable code previously presented at the terminal device. For example, while the user device is scanning the machine-readable code using its camera, the terminal device can quickly replace the code with the updated machine-readable code.

At block 612, the server device can receive a data exchange request from the user device. The data exchange request can include the token. For example, the user device can send the data exchange request to proceed with the data exchange.

At block 614, the server device can validate the token received with the data exchange request. For example, the server device can compare the token received with the data exchange request with the token originally generated by the server device. If the tokens match, then the server device can confirm that the user device is present at the terminal device. In some embodiments, if the token is successfully validated, the server device can send a further indication that the token was successfully validated to the user device.

In some embodiments, if the token is successfully validated the server device can complete the data exchange session. Completing the data exchange session can include communicating with another computing system or device to complete the remaining operations of the data exchanges session. For example, for a payment transaction, completing the data exchange session can include the server device sending completion data to a third-party service provider for validating payment method and communicating with an institution associated with the terminal device to complete the payment. As another example, for an access transaction, completing the data exchange session can include the server device communicating with an access control device to validate a credential associated with the user device to grant access at the terminal device (e.g., via a door lock, secure gate, or digital file access at the terminal device).

Implementations within the scope of the present disclosure can be partially or entirely realized using a tangible computer-readable storage medium (or multiple tangible computer-readable storage media of one or more types) encoding one or more computer-readable instructions. It should be recognized that computer-executable instructions can be organized in any format, including applications, widgets, processes, software, and/or components.

Figure 7A:
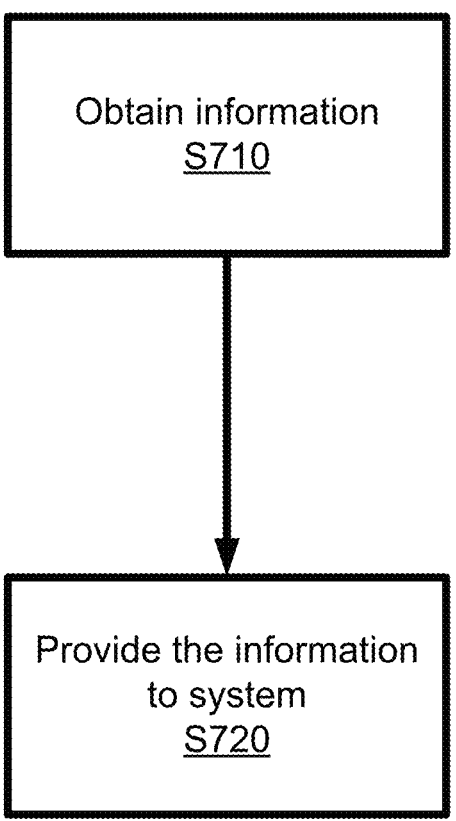
FIGS. 7A and 7B illustrate methods of application processes, in accordance with some embodiments.
Figure 7B:
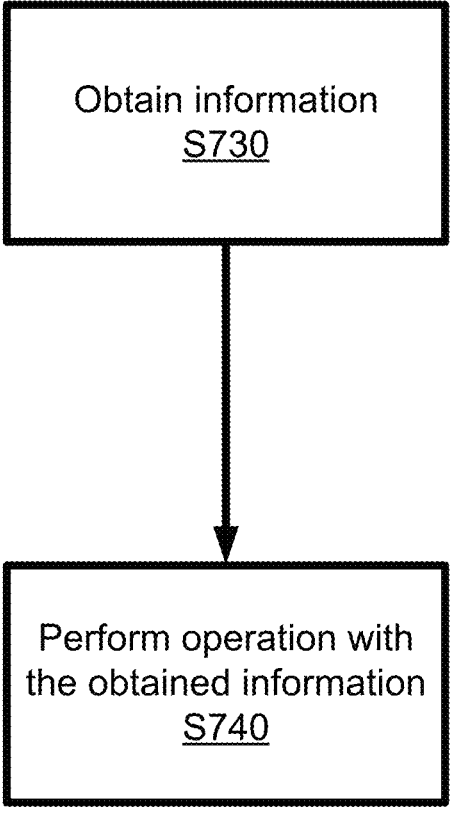

Implementations within the scope of the present disclosure include a computer-readable storage medium that encodes instructions organized as an application (e.g., application 760) that, when executed by one or more processing units, control an electronic device (e.g., device 750) to perform the method of FIG. 7A, the method of FIG. 7B, and/or one or more other processes and/or methods described herein.

It should be recognized that application 760 (shown in FIG. 7C) can be any suitable type of application, including, for example, one or more of: an accessory companion application, a browser application, an application that functions as an execution environment for plug-ins, widgets or other applications, a fitness application, a health application, a digital payments application, a media application, a social network application, a messaging application, and/or a maps application. In some embodiments, application 760 is an application that is pre-installed on device 750 at purchase (e.g., a first party application). In other embodiments, application 760 is an application that is provided to device 750 via an operating system update file (e.g., a first party application or a second party application). In other embodiments, application 760 is an application that is provided via an application store. In some embodiments, the application store can be an application store that is pre-installed on device 750 at purchase (e.g., a first party application store). In other embodiments, the application store is a third-party application store (e.g., an application store that is provided by another application store, downloaded via a network, and/or read from a storage device).

Figure 7D:
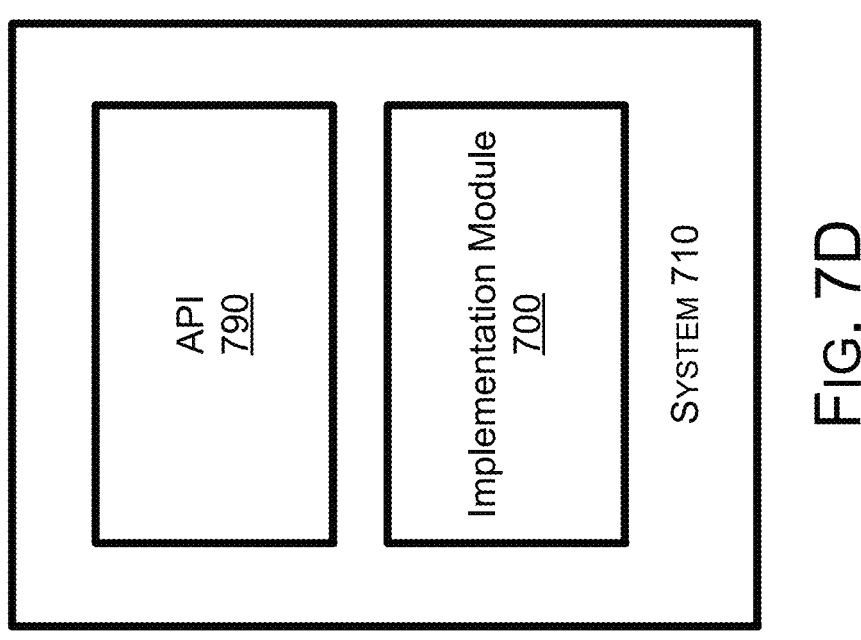
FIG. 7D illustrates a system for implementing an API, in accordance with some embodiments.
Figure 7C:
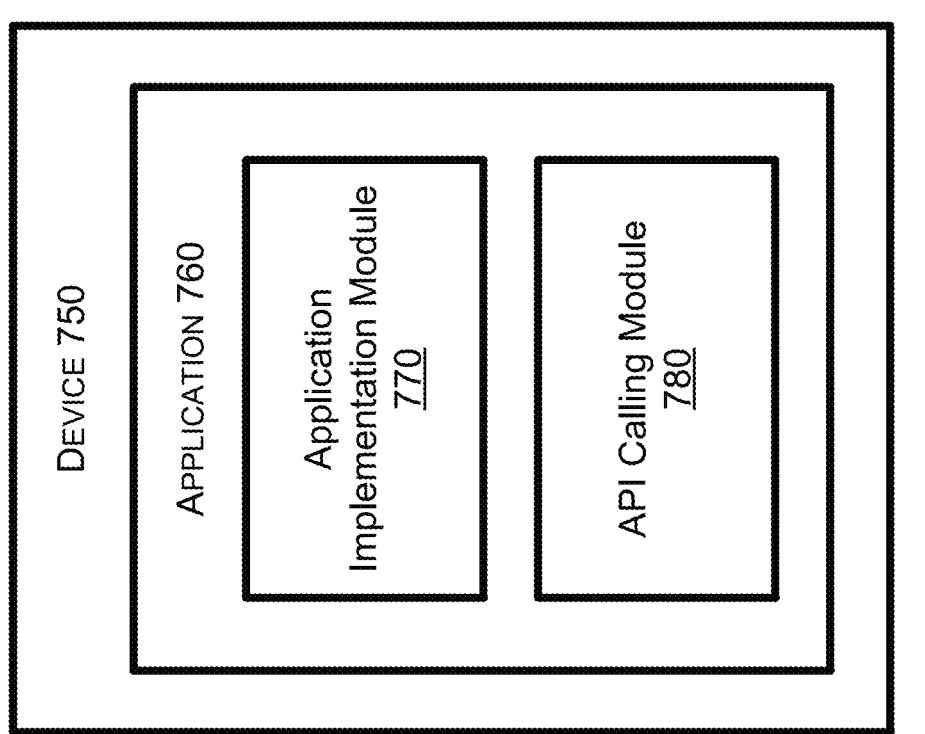
FIG. 7C illustrates a device for implementing an API, in accordance with some embodiments.
Figure 7E:
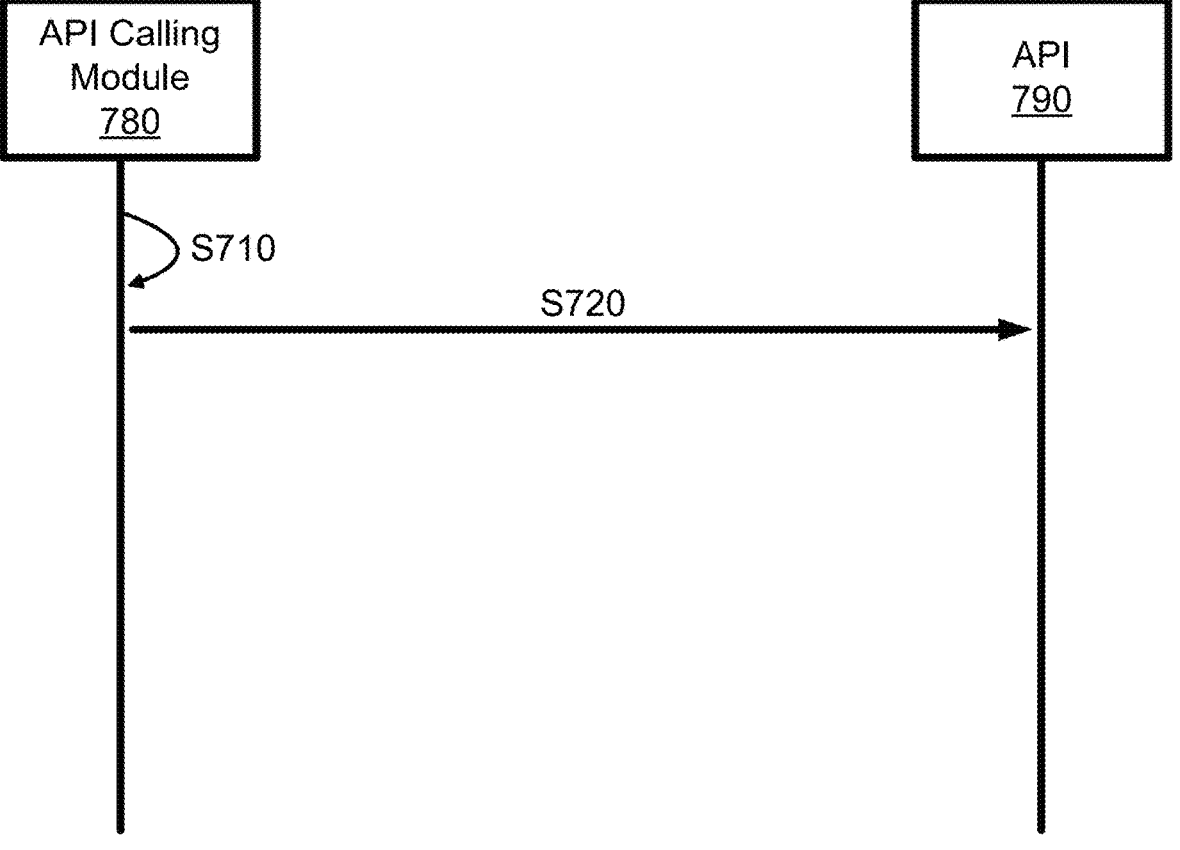
FIGS. 7E and 7F illustrate data flows related to API processes, in accordance with some embodiments.

Referring to FIG. 7A and FIG. 7E, application 760 obtains information (e.g., S710). In some embodiments, at S710, information is obtained from at least one hardware component of the device 750. In some embodiments, at S710, information is obtained from at least one software module of the device 750. In some embodiments, at S710, information is obtained from at least one hardware component external to the device 750 (e.g., a peripheral device, an accessory device, a server, etc.). In some embodiments, the information obtained at S710 includes positional information, time information, notification information, user information, environment information, electronic device state information, weather information, media information, historical information, event information, hardware information, and/or motion information. In some embodiments, in response to and/or after obtaining the information at S710, application 760 provides the information to a system (e.g., S720).

In some embodiments, the system (e.g., 710 shown in FIG. 7D) is an operating system hosted on the device 750. In some embodiments, the system (e.g., 710 shown in FIG.

7D) is an external device (e.g., a server, a peripheral device, an accessory, a personal computing device, etc.) that includes an operating system.

Figure 7F:
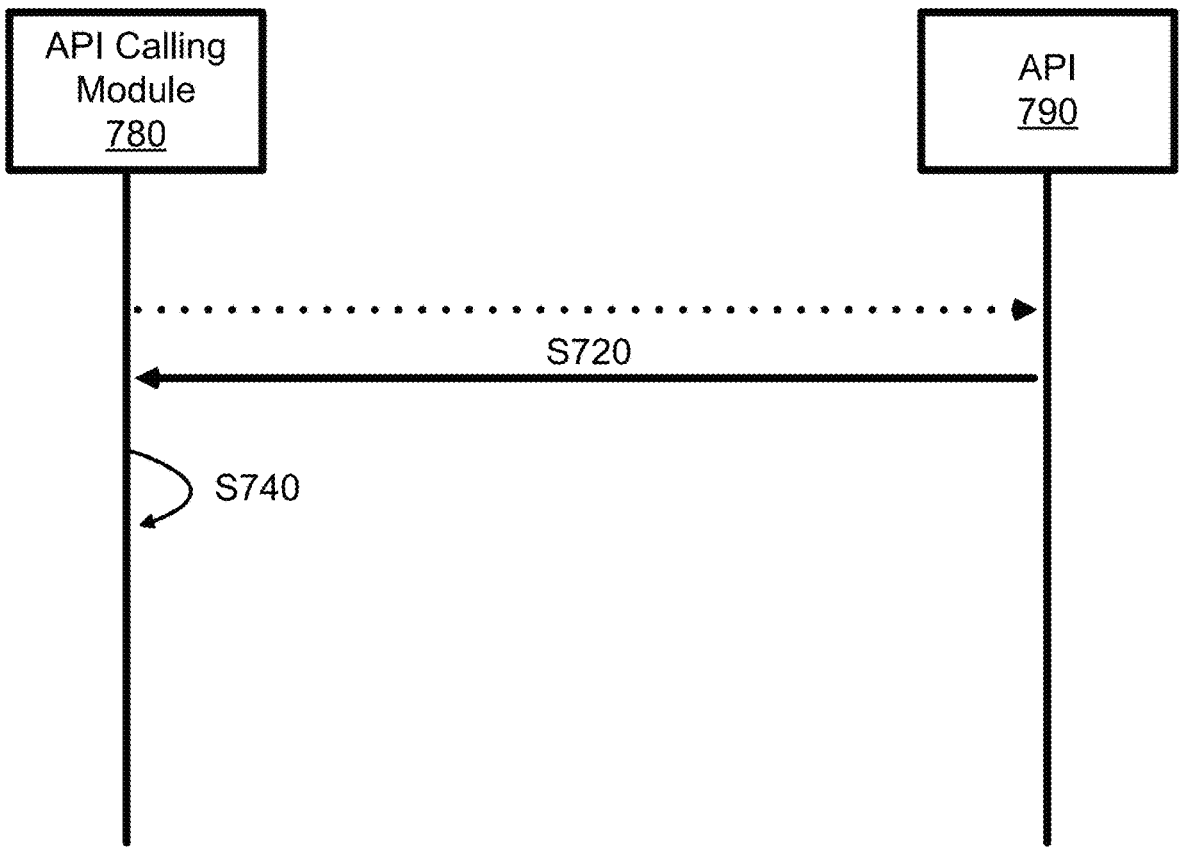

Referring to FIG. 7B and FIG. 7F, application 760 obtains information (e.g., S730). In some embodiments, the information obtained at S730 includes positional information, time information, notification information, user information, environment information electronic device state information, weather information, media information, historical information, event information, hardware information and/or motion information. In response to and/or after obtaining the information at S730, application 760 performs an operation with the information (e.g., S740). In some embodiments, the operation performed at S740 includes: providing a notification based on the information, sending a message based on the information, displaying the information, controlling a user interface of a fitness application based on the information, controlling a user interface of a health application based on the information, controlling a focus mode based on the information, setting a reminder based on the information, adding a calendar entry based on the information, and/or calling an API of system 710 based on the information.

In some embodiments, one or more steps of the method of FIG. 7A and/or the method of FIG. 7B is performed in response to a trigger. In some embodiments, the trigger includes detection of an event, a notification received from system 710, a user input, and/or a response to a call to an API provided by system 710.

In some embodiments, the instructions of application 760, when executed, control device 750 to perform the method of FIG. 7A and/or the method of FIG. 7B by calling an application programming interface (API) (e.g., API 790) provided by system 710. In some embodiments, application 760 performs at least a portion of the method of FIG. 7A and/or the method of FIG. 7B without calling API 790.

In some embodiments, one or more steps of the method of FIG. 7A and/or the method of FIG. 7B includes calling an API (e.g., API 790) using one or more parameters defined by the API. In some embodiments, the one or more parameters include a constant, a key, a data structure, an object, an object class, a variable, a data type, a pointer, an array, a list or a pointer to a function or method, and/or another way to reference a data or other item to be passed via the API.

Referring to FIG. 7C, device 750 is illustrated. In some embodiments, device 750 is a personal computing device, a smart phone, a smart watch, a fitness tracker, a head mounted display (HMD) device, a media device, a communal device, a speaker, a television, and/or a tablet. As illustrated in FIG. 7C, device 750 includes application 760 and operating system (e.g., system 710 shown in FIG. 7D). Application 760 includes application implementation module 770 and API calling module 780. System 710 includes API 790 and implementation module 700. It should be recognized that device 750, application 760, and/or system 710 can include more, fewer, and/or different components than illustrated in FIGS. 7C and 7D.

In some embodiments, application implementation module 770 includes a set of one or more instructions corresponding to one or more operations performed by application 760. For example, when application 760 is a messaging application, application implementation module 770 can include operations to receive and send messages. In some embodiments, application implementation module 770 communicates with API calling module to communicate with system 710 via API 790 (shown in FIG. 7D).

In some embodiments, API 790 is a software module (e.g., a collection of computer-readable instructions) that provides an interface that allows a different module (e.g., API calling module 780) to access and/or use one or more functions, methods, procedures, data structures, classes, and/or other services provided by implementation module 700 of system 710. For example, API-calling module 780 can access a feature of implementation module 700 through one or more API calls or invocations (e.g., embodied by a function or a method call) exposed by API 790 and can pass data and/or control information using one or more parameters via the API calls or invocations. In some embodiments, API 790 allows application 760 to use a service provided by a Software Development Kit (SDK) library. In other embodiments, application 760 incorporates a call to a function or method provided by the SDK library and provided by API 790 or uses data types or objects defined in the SDK library and provided by API 790. In some embodiments, API-calling module 780 makes an API call via API 790 to access and use a feature of implementation module 700 that is specified by API 790. In such embodiments, implementation module 700 can return a value via API 790 to API-calling module 780 in response to the API call. The value can report to application 760 the capabilities or state of a hardware component of device 750, including those related to aspects such as input capabilities and state, output capabilities and state, processing capability, power state, storage capacity and state, and/or communications capability. In some embodiments, API 790 is implemented in part by firmware, microcode, or other low level logic that executes in part on the hardware component.

In some embodiments, API 790 allows a developer of API-calling module 780 (which can be a third-party developer) to leverage a feature provided by implementation module 700. In such embodiments, there can be one or more API-calling modules (e.g., including API-calling module 780) that communicate with implementation module 700. In some embodiments, API 790 allows multiple API-calling modules written in different programming languages to communicate with implementation module 700 (e.g., API 790 can include features for translating calls and returns between implementation module 700 and API-calling module 780) while API 790 is implemented in terms of a specific programming language. In some embodiments, API-calling module 780 calls APIs from different providers such as a set of APIs from an OS provider, another set of APIs from a plug-in provider, and/or another set of APIs from another provider (e.g., the provider of a software library) or creator of the another set of APIs.

Examples of API 790 can include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a bluetooth API, an NFC API, a UWB API, a fitness API, a smart home API, contact transfer API, photos API, camera API, and/or image processing API. In some embodiments the sensor API is an API for accessing data associated with a sensor of device 750. For example, the sensor API can provide access to raw sensor data. For another example, the sensor API can provide data derived (and/or generated) from the raw sensor data. In some embodiments, the sensor data includes temperature data, image data, video data, audio data, heart rate data, IMU (inertial measurement unit) data, lidar data, location data, GPS data, and/or camera data. In some embodiments, the sensor includes one or more of an accelerometer, temperature sensor, infrared sensor, optical sensor, heartrate sensor, barometer, gyroscope, proximity sensor, temperature sensor and/or biometric sensor.

In some embodiments, implementation module 700 is an system (e.g., operating system, server system) software module (e.g., a collection of computer-readable instructions) that is constructed to perform an operation in response to receiving an API call via API 790. In some embodiments, implementation module 700 is constructed to provide an API response (via API 790) as a result of processing an API call. By way of example, implementation module 700 and API-calling module 180 can each be any one of an operating system, a library, a device driver, an API, an application program, or other module. It should be understood that implementation module 700 and API-calling module 780 can be the same or different type of module from each other. In some embodiments, implementation module 700 is embodied at least in part in firmware, microcode, or other hardware logic.

In some embodiments, implementation module 700 returns a value through API 790 in response to an API call from API-calling module 780. While API 790 defines the syntax and result of an API call (e.g., how to invoke the API call and what the API call does), API 790 might not reveal how implementation module 700 accomplishes the function specified by the API call. Various API calls are transferred via the one or more application programming interfaces between API-calling module 780 and implementation module 700. Transferring the API calls can include issuing, initiating, invoking, calling, receiving, returning, and/or responding to the function calls or messages. In other words, transferring can describe actions by either of API-calling module 780 or implementation module 700. In some embodiments, a function call or other invocation of API 790 sends and/or receives one or more parameters through a parameter list or other structure.

In some embodiments, implementation module 700 provides more than one API, each providing a different view of or with different aspects of functionality implemented by implementation module 700. For example, one API of implementation module 700 can provide a first set of functions and can be exposed to third party developers, and another API of implementation module 700 can be hidden (e.g., not exposed) and provide a subset of the first set of functions and also provide another set of functions, such as testing or debugging functions which are not in the first set of functions. In some embodiments, implementation module 700 calls one or more other components via an underlying API and thus be both an API calling module and an implementation module. It should be recognized that implementation module 700 can include additional functions, methods, classes, data structures, and/or other features that are not specified through API 790 and are not available to API calling module 780. It should also be recognized that API calling module 780 can be on the same system as implementation module 700 or can be located remotely and access implementation module 700 using API 790 over a network. In some embodiments, implementation module 700, API 790, and/or API-calling module 780 is stored in a machine-readable medium, which includes any mechanism for storing information in a form readable by a machine (e.g., a computer or other data processing system). For example, a machine-readable medium can include magnetic disks, optical disks, random access memory; read only memory, and/or flash memory devices.

In some embodiments, process 500 of FIG. 5 and/or process 600 of FIG. 6 are performed at a first computer system (as described herein) via a system process (e.g., an operating system process, a server system process) that is different from one or more applications executing and/or installed on the first computer system.

In some embodiments, process 500 of FIG. 5 and/or process 600 of FIG. 6 is performed at a first computer system (as described herein) by an application that is different from a system process. In some embodiments, the instructions of the application, when executed, control the first computer system to perform process 500 of FIG. 5 and/or process 600 of FIG. 6 by calling an application programming interface (API) provided by the system process. In some embodiments, the application performs at least a portion of process 500 of FIG. 5 and/or process 600 of FIG. 6 without calling the API.

In some embodiments, the application is an accessory companion application that is constructed for processing communication and management between the first computer system and an accessory device (e.g., a wearable device, such as, for example, a watch).

In some embodiments, the application is an application that is pre-installed on the first computer system at purchase (e.g., a first party application). In other embodiments, the application is an application that is provided to the first computer system via an operating system update file (e.g., a first party application). In other embodiments, the application is an application that is provided via an application store. In some implementations, the application store is pre-installed on the first computer system at purchase (e.g., a first party application store) and allows download of one or more applications. In some embodiments, the application store is a third party application store (e.g., an application store that is provided by another device, downloaded via a network, and/or read from a storage device). In some embodiments, the application is a third party application (e.g., an app that is provided by an application store, downloaded via a network, and/or read from a storage device). In some embodiments, the application controls the first computer system to perform process 500 of FIG. 5 and/or process 600 of FIG. 6 by calling an application programming interface (API) provided by the system process using one or more parameters.

In some embodiments, exemplary APIs provided by the system process include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a bluetooth API, an NFC API, a UWB API, a fitness API, a smart home API, contact transfer API, photos API, camera API, and/or image processing API.

In some embodiments, at least one API is a software module (e.g., a collection of computer-readable instructions) that provides an interface that allows a different module (e.g., API calling module) to access and use one or more functions, methods, procedures, data structures, classes, and/or other services provided by an implementation module of the system process. The API can define one or more parameters that are passed between the API calling module and the implementation module. In some embodiments, the API 790 defines a first API call that can be provided by API calling module 790. The implementation module is a system software module (e.g., a collection of computer-readable instructions) that is constructed to perform an operation in response to receiving an API call via the API. In some embodiments, the implementation module is constructed to provide an API response (via the API) as a result of processing an API call. In some embodiments, the implementation module is included in the device (e.g., 750) that runs the application. In some embodiments, the implementation module is included in an electronic device that is separate from the device that runs the application.

Illustrative methods and devices for using data exchange options in a data exchange session are described above. Some or all of these devices and methods may, but need not, be implemented at least partially by architectures such as those shown at least in FIG. 4. Further, in the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various examples further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most examples utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In examples utilizing a network server, the network server can run any of a variety of server or mid-tier applications, including HTTP servers, FTP servers, CGI servers, data servers, Java servers, and business application servers. The server(s) may also be capable of executing programs or scripts in response to requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or browser. It should be appreciated that alternate examples may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable media for containing code, or portions of code, can include any appropriate media known or used in the art, including storage media, such as, but not limited to, volatile and non-volatile, removable and non-removable media implemented in any method or technology for storage of information such as computer-readable instructions, data structures, program modules, or other data, including RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by a system device. Based at least in part on the disclosure and teachings provided herein, a person of ordinary skill in the art will appreciate other ways and/or methods to implement the various examples.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (e.g., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

As described above, one aspect of the present technology is the gathering and use of data to improve the functioning of data exchange between user devices and various third party devices including terminal devices. The present disclosure contemplates that in some instances, this gathered data may include personally identifiable information (PII) data that uniquely identifies or can be used to contact or locate a specific person. Such personal information data can include demographic data, location-based data (e.g., GPS coordinates), telephone numbers, email addresses, Twitter ID's, home addresses, or any other identifying or personal information.

The present disclosure recognizes that the use of such personal information data, in the present technology, can be used to the benefit of users. For example, the personal information data can be used to obtain access to an application for locating peripheral devices associated with a user, user account, or a user device.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of services related to tracking a user's location (e.g., via the user's mobile device), the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

As described herein, content is automatically generated by one or more computers in response to a request to generate the content. The automatically-generated content is optionally generated on-device (e.g., generated at least in part by a computer system at which a request to generate the content is received) and/or generated off-device (e.g., generated at least in part by one or more nearby computers that are available via a local network or one or more computers that are available via the internet). This automatically-generated content optionally includes visual content (e.g., images, graphics, and/or video), audio content, and/or text content.

In some embodiments, novel automatically-generated content that is generated via one or more artificial intelligence (AI) processes is referred to as generative content (e.g., generative images, generative graphics, generative video, generative audio, and/or generative text). Generative content is typically generated by an AI process based on a prompt that is provided to the AI process. An AI process typically uses one or more AI models to generate an output based on an input. An AI process optionally includes one or more pre-processing steps to adjust the input before it is used by the AI model to generate an output (e.g., adjustment to a user-provided prompt, creation of a system-generated prompt, and/or AI model selection). An AI process optionally includes one or more post-processing steps to adjust the output by the AI model (e.g., passing AI model output to a different AI model, upscaling, downscaling, cropping, formatting, and/or adding or removing metadata) before the output of the AI model used for other purposes such as being provided to a different software process for further processing or being presented (e.g., visually or audibly) to a user. An AI process that generates generative content is sometimes referred to as a generative AI process.

A prompt for generating generative content can include one or more of: one or more words (e.g., a natural language prompt that is written or spoken), one or more images, one or more drawings, and/or one or more videos. AI processes can include machine learning models including neural networks. Neural networks can include transformer-based deep neural networks such as large language models (LLMs). Generative pre-trained transformer models are a type of LLM that can be effective at generating novel generative content based on a prompt. Some AI processes use a prompt that includes text to generate either different generative text, generative audio content, and/or generative visual content. Some AI processes use a prompt that includes visual content and/or an audio content to generate generative text (e.g., a transcription of audio and/or a description of the visual content). Some multi-modal AI processes use a prompt that includes multiple types of content (e.g., text, images, audio, video, and/or other sensor data) to generate generative content. A prompt sometimes also includes values for one or more parameters indicating an importance of various parts of the prompt. Some prompts include a structured set of instructions that can be understood by an AI process that include phrasing, a specified style, relevant context (e.g., starting point content and/or one or more examples), and/or a role for the AI process.

Generative content is generally based on the prompt but is not deterministically selected from pre-generated content and is, instead, generated using the prompt as a starting point. In some embodiments, pre-existing content (e.g., audio, text, and/or visual content) is used as part of the prompt for creating generative content (e.g., the pre-existing content is used as a starting point for creating the generative content). For example, a prompt could request that a block of text be summarized or rewritten in a different tone, and the output would be generative text that is summarized or written in the different tone. Similarly a prompt could request that visual content be modified to include or exclude content specified by a prompt (e.g., removing an identified feature in the visual content, adding a feature to the visual content that is described in a prompt, changing a visual style of the visual content, and/or creating additional visual elements outside of a spatial or temporal boundary of the visual content that are based on the visual content). In some embodiments, a random or pseudo-random seed is used as part of the prompt for creating generative content (e.g., the random or pseud-random seed content is used as a starting point for creating the generative content). For example when generating an image from a diffusion model, a random noise pattern is iteratively denoised based on the prompt to generate an image that is based on the prompt. While specific types of AI processes have been described herein, it should be understood that a variety of different AI processes could be used to generate generative content based on a prompt.

Some embodiments described herein can include use of artificial intelligence and/or machine learning systems (sometimes referred to herein as the AI/ML systems). The use can include collecting, processing, labeling, organizing, analyzing, recommending and/or generating data. Entities that collect, share, and/or otherwise utilize user data should provide transparency and/or obtain user consent when collecting such data. The present disclosure recognizes that the use of the data in the AI/ML systems can be used to benefit users. For example, the data can be used to train models that can be deployed to improve performance, accuracy, and/or functionality of applications and/or services. Accordingly, the use of the data enables the AI/ML systems to adapt and/or optimize operations to provide more personalized, efficient, and/or enhanced user experiences. Such adaptation and/or optimization can include tailoring content, recommendations, and/or interactions to individual users, as well as streamlining processes, and/or enabling more intuitive interfaces. Further beneficial uses of the data in the AI/ML systems are also contemplated by the present disclosure.

The present disclosure contemplates that, in some embodiments, data used by AI/ML systems includes publicly available data. To protect user privacy, data may be anonymized, aggregated, and/or otherwise processed to remove or to the degree possible limit any individual identification. As discussed herein, entities that collect, share, and/or otherwise utilize such data should obtain user consent prior to and/or provide transparency when collecting such data. Furthermore, the present disclosure contemplates that the entities responsible for the use of data, including, but not limited to data used in association with AI/ML systems, should attempt to comply with well-established privacy policies and/or privacy practices.

For example, such entities may implement and consistently follow policies and practices recognized as meeting or exceeding industry standards and regulatory requirements for developing and/or training AI/ML systems. In doing so, attempts should be made to ensure all intellectual property rights and privacy considerations are maintained. Training should include practices safeguarding training data, such as personal information, through sufficient protections against misuse or exploitation. Such policies and practices should cover all stages of the AI/ML systems development, training, and use, including data collection, data preparation, model training, model evaluation, model deployment, and ongoing monitoring and maintenance. Transparency and accountability should be maintained throughout. Such policies should be easily accessible by users and should be updated as the collection and/or use of data changes. User data should be collected for legitimate and reasonable uses of the entity and not shared or sold outside of those legitimate uses. Further, such collection and sharing should occur through transparency with users and/or after receiving the informed consent of the users. Additionally, such entities should consider taking any needed steps for safeguarding and securing access to such data and ensuring that others with access to the data adhere to their privacy policies and procedures. Further, such entities should subject themselves to evaluation by third parties to certify, as appropriate for transparency purposes, their adherence to widely accepted privacy policies and practices. In addition, policies and/or practices should be adapted to the particular type of data being collected and/or accessed and tailored to a specific use case and applicable laws and standards, including jurisdiction-specific considerations.

In some embodiments, AI/ML systems may utilize models that may be trained (e.g., supervised learning or unsupervised learning) using various training data, including data collected using a user device. Such use of user-collected data may be limited to operations on the user device. For example, the training of the model can be done locally on the user device so no part of the data is sent to another device. In other implementations, the training of the model can be performed using one or more other devices (e.g., server(s)) in addition to the user device but done in a privacy preserving manner, e.g., via multi-party computation as may be done cryptographically by secret sharing data or other means so that the user data is not leaked to the other devices.

In some embodiments, the trained model can be centrally stored on the user device or stored on multiple devices, e.g., as in federated learning. Such decentralized storage can similarly be done in a privacy preserving manner, e.g., via cryptographic operations where each piece of data is broken into shards such that no device alone (i.e., only collectively with another device(s)) or only the user device can reassemble or use the data. In this manner, a pattern of behavior of the user or the device may not be leaked, while taking advantage of increased computational resources of the other devices to train and execute the ML model. Accordingly, user-collected data can be protected. In some implementations, data from multiple devices can be combined in a privacy-preserving manner to train an ML model.

In some embodiments, the present disclosure contemplates that data used for AI/ML systems may be kept strictly separated from platforms where the AI/ML systems are deployed and/or used to interact with users and/or process data. In such embodiments, data used for offline training of the AI/ML systems may be maintained in secured datastores with restricted access and/or not be retained beyond the duration necessary for training purposes. In some embodiments, the AI/ML systems may utilize a local memory cache to store data temporarily during a user session. The local memory cache may be used to improve performance of the AI/ML systems. However, to protect user privacy, data stored in the local memory cache may be erased after the user session is completed. Any temporary caches of data used for online learning or inference may be promptly erased after processing. All data collection, transfer, and/or storage should use industry-standard encryption and/or secure communication.

In some embodiments, as noted above, techniques such as federated learning, differential privacy, secure hardware components, homomorphic encryption, and/or multi-party computation among other techniques may be utilized to further protect personal information data during training and/or use of the AI/ML systems. The AI/ML systems should be monitored for changes in underlying data distribution such as concept drift or data skew that can degrade performance of the AI/ML systems over time.

In some embodiments, the AI/ML systems are trained using a combination of offline and online training. Offline training can use curated datasets to establish baseline model performance, while online training can allow the AI/ML systems to continually adapt and/or improve. The present disclosure recognizes the importance of maintaining strict data governance practices throughout this process to ensure user privacy is protected.

In some embodiments, the AI/ML systems may be designed with safeguards to maintain adherence to originally intended purposes, even as the AI/ML systems adapt based on new data. Any significant changes in data collection and/or applications of an AI/ML system use may (and in some cases should) be transparently communicated to affected stakeholders and/or include obtaining user consent with respect to changes in how user data is collected and/or utilized.

Despite the foregoing, the present disclosure also contemplates embodiments in which users selectively restrict and/or block the use of and/or access to data. That is, the present disclosure contemplates that hardware and/or software elements can be provided to prevent or block access to data. For example, in the case of some services, the present technology should be configured to allow users to select to "opt in" or "opt out" of participation in the collection of data during registration for services or anytime thereafter. In another example, the present technology should be configured to allow users to select not to provide certain data for training the AI/ML systems and/or for use as input during the inference stage of such systems. In yet another example, the present technology should be configured to allow users to be able to select to limit the length of time data is maintained or entirely prohibit the use of their data for use by the AI/ML systems. In addition to providing "opt in" and "opt out" options, the present disclosure contemplates providing notifications relating to the access or use of personal information. For instance, a user can be notified when their data is being input into the AI/ML systems for training or inference purposes, and/or reminded when the AI/ML systems generate outputs or make decisions based on their data.

The present disclosure recognizes AI/ML systems should incorporate explicit restrictions and/or oversight to mitigate against risks that may be present even when such systems having been designed, developed, and/or operated according to industry best practices and standards. For example, outputs may be produced that could be considered erroneous, harmful, offensive, and/or biased; such outputs may not necessarily reflect the opinions or positions of the entities developing or deploying these systems. Furthermore, in some cases, references to third-party products and/or services in the outputs should not be construed as endorsements or affiliations by the entities providing the AI/ML systems. Generated content can be filtered for potentially inappropriate or dangerous material prior to being presented to users, while human oversight and/or ability to override or correct erroneous or undesirable outputs can be maintained as a failsafe.

The present disclosure further contemplates that users of the AI/ML systems should refrain from using the services in any manner that infringes upon, misappropriates, or violates the rights of any party. Furthermore, the AI/ML systems should not be used for any unlawful or illegal activity, nor to develop any application or use case that would commit or facilitate the commission of a crime, or other tortious, unlawful, or illegal act. The AI/ML systems should not violate, misappropriate, or infringe any copyrights, trademarks, rights of privacy and publicity, trade secrets, patents, or other proprietary or legal rights of any party, and appropriately attribute content as required. Further, the AI/ML systems should not interfere with any security, digital signing, digital rights management, content protection, verification, or authentication mechanisms. The AI/ML systems should not misrepresent machine-generated outputs as being human-generated.

All references, including publications, patent applications, and patents, cited herein are hereby incorporated by reference to the same extent as if each reference were individually and specifically indicated to be incorporated by reference and were set forth in its entirety herein.

What is claimed is:

1. A method performed by a server device, the method comprising:

responsive to a request from a terminal device, initiating a data exchange session with the terminal device; and while in the data exchange session:

sending, to the terminal device, first information associated with the data exchange session, the first information usable to generate a machine-readable code at the terminal device;

receiving, from a user device, an indication that the user device has obtained the machine-readable code;

responsive to the indication, generating a token corresponding to the user device;

sending, to the terminal device, second information associated with the data exchange session, the second information usable to generate an updated machine-readable code at the terminal device, the second information comprising the token;

receiving, from the user device, a data exchange request comprising the token; and validating the token received with the data exchange request.

2. The method of claim 1, further comprising sending, to the user device and based at least in part on the token being successfully validated, a further indication that the token was successfully validated.

3. The method of claim 1, wherein the token uniquely identifies a user account associated with the user device.

4. The method of claim 1, wherein the token uniquely identifies the user device.

5. The method of claim 1, further comprising completing the data exchange session based at least in part on successfully validating the token received with the data exchange request.

6. The method of claim 5, wherein completing the data exchange session comprises transmitting completion data to a third party server device.

7. The method of claim 1, wherein the machine-readable code is presented at a terminal device.

8. The method of claim 1, wherein the updated machine-readable code is presented at the terminal device by replacing the machine-readable code presented at the terminal device.

9. A server device, comprising:

one or more processors; and one or more memories storing computer-executable instructions that, when executed by the one or more processors, cause the server device to perform operations comprising:

responsive to a request from a terminal device, initiating a data exchange session with the terminal device; and while in the data exchange session:

sending, to the terminal device, first information associated with the data exchange session, the first information usable to generate a machine-readable code at the terminal device;

receiving, from a user device, an indication that the user device has obtained the machine-readable code;

responsive to the indication, generating a token corresponding to the user device;

sending, to the terminal device, second information associated with the data exchange session, the second information usable to generate an updated machine-readable code at the terminal device, the second information comprising the token;

receiving, from the user device, a data exchange request comprising the token; and validating the token received with the data exchange request.

10. The server device of claim 9, further comprising sending, to the user device and based at least in part on the token being successfully validated, a further indication that the token was successfully validated.

11. The server device of claim 9, wherein the token uniquely identifies a user account associated with the user device.

12. The server device of claim 9, wherein the token uniquely identifies the user device.

13. The server device of claim 9, further comprising completing the data exchange session based at least in part on successfully validating the token received with the data exchange request.

14. The server device of claim 13, wherein completing the data exchange session comprises transmitting completion data to a third party server device.

15. The server device of claim 9, wherein the machine-readable code is presented at a terminal device.

16. The server device of claim 9, wherein the updated machine-readable code is presented at the terminal device by replacing the machine-readable code presented at the terminal device.

17. One or more computer-readable media storing computer-executable instructions that, when executed by one or more processors, cause the one or more processors to perform operations comprising:

responsive to a request from a terminal device, initiating a data exchange session with the terminal device; and while in the data exchange session:

sending, to the terminal device, first information associated with the data exchange session, the first information usable to generate a machine-readable code at the terminal device;

receiving, from a user device, an indication that the user device has obtained the machine-readable code;

responsive to the indication, generating a token corresponding to the user device;

sending, to the terminal device, second information associated with the data exchange session, the second information usable to generate an updated machine-readable code at the terminal device, the second information comprising the token;

receiving, from the user device, a data exchange request comprising the token; and validating the token received with the data exchange request.

18. The one or more computer-readable media of claim 17, storing additional computer-executable instructions that, when executed by the one or more processors, cause the one or more processors to perform further operations comprising sending, to the user device and based at least in part on the token being successfully validated, a further indication that the token was successfully validated.

19. The one or more computer-readable media of claim 17, wherein the token uniquely identifies a user account associated with the user device.

20. The one or more computer-readable media of claim 17, wherein the token uniquely identifies the user device.

\* \* \* \* \*